United States Patent
Hata

(10) Patent No.: US 11,629,234 B2
(45) Date of Patent: Apr. 18, 2023

(54) POLYMERIC POLYMERIZATION INITIATOR AND METHOD FOR PRODUCING POLYMERIC POLYMERIZATION INITIATOR

(71) Applicant: SHIN-ETSU CHEMICAL CO., LTD., Tokyo (JP)

(72) Inventor: Ryunosuke Hata, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 11 days.

(21) Appl. No.: 17/276,095

(22) PCT Filed: Aug. 2, 2019

(86) PCT No.: PCT/JP2019/030395
§ 371 (c)(1),
(2) Date: Mar. 12, 2021

(87) PCT Pub. No.: WO2020/070964
PCT Pub. Date: Apr. 9, 2020

(65) Prior Publication Data
US 2022/0081516 A1 Mar. 17, 2022

(30) Foreign Application Priority Data
Oct. 3, 2018 (JP) .............................. JP2018-188153

(51) Int. Cl.
C08G 77/50 (2006.01)
C08G 77/06 (2006.01)
C08G 77/18 (2006.01)

(52) U.S. Cl.
CPC ............ C08G 77/50 (2013.01); C08G 77/06 (2013.01); C08G 77/18 (2013.01)

(58) Field of Classification Search
CPC .................................. C08G 77/50; C08G 77/18
See application file for complete search history.

(56) References Cited

U.S. PATENT DOCUMENTS 5,187,244 A * 2/1993 Sugimori ............ C08G 77/442
528/21
5,326,890 A 7/1994 Wnek et al.
2010/0130693 A1 5/2010 Yamada et al.
2015/0374612 A1 12/2015 Nakazono et al.
2018/0094092 A1 4/2018 Itoh et al.

FOREIGN PATENT DOCUMENTS

| EP | 520 746 | * | 12/1992 |
| JP | H02-124914 A | | 5/1990 |
| JP | H03-244612 A | | 10/1991 |
| JP | 2876013 B2 | | 3/1999 |
| JP | 2008-274116 A | | 11/2008 |
| JP | 2014-177447 A | | 9/2014 |
| JP | 2015-131938 A | | 7/2015 |
| JP | 2018-059073 A | | 4/2018 |

OTHER PUBLICATIONS

Zhu et al. "Synthesis of PMMA Star Polymers with Siloxane Cores via Group Transfer Polymerization Using Silyl Ketene Acetal Functionalized Cyclic Siloxanes", Marcromolecules 1992, 7330-7333.*
Ruder et al., Polymer Preprints, 1999, 133-134.*
Jun. 22, 2021 Office Action issued in Japanese Patent Application No. 2018-188153.

(Continued)

*Primary Examiner* — Margaret G Moore
(74) *Attorney, Agent, or Firm* — Oliff PLC

(57) ABSTRACT

A polymeric polymerization initiator represented by the following formula (I). $M^1{}_a M^2{}_b D^1{}_c D^2{}_d T^1{}_e T^2{}_f Q_g$ (I) $M^1 = R^1{}_3 SiO_{1/2}$ $M^2 = R^1{}_2 R^2 SiO_{1/2}$ $D^1 = R^1{}_2 SiO_{2/2}$ $D^2 = R^1 R^2 SiO_{2/2}$ $T^1 = R^1 SiO_{3/2}$ $T^2 = R^2 SiO_{3/2}$ $Q = SiO_{4/2}$ [$R^1$ represents a hydrogen atom, a substituted or unsubstituted alkyl group, or a substituted or unsubstituted aryl group. $R^2$ represents a group having a ketene silyl acetal structure represented by the following formula (II). (A represents a single bond or a divalent organic group, $R^3$ represents a hydrogen atom or a substituted or unsubstituted alkyl group, and $R^4$ represents a substituted or unsubstituted alkyl group.) "a", "b", "c", "d", "e", "f", and "g" represent 0 or a positive integer where $b+d+f \geq 1$. An order of bonding of siloxane units is optionally determined.]

(II)

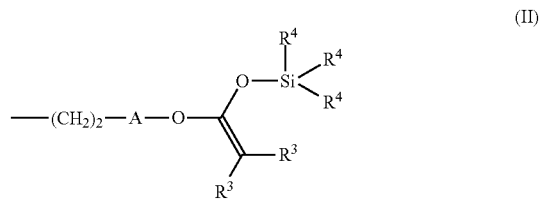

2 Claims, 1 Drawing Sheet

(56) References Cited

OTHER PUBLICATIONS

Oct. 21, 2019 Search Report issued in International Patent Application No. PCT/JP2019/030395.
Mar. 23, 2021 International Preliminary Report on Patentability issued in International Patent Application No. PCT/JP2019/030395.
May 25, 2022 Extended Search Report issued in European Patent Application No. 19869632.0.
Nov. 15, 2022 Office Action issued in Chinese Patent Application No. 201980063287.3.

* cited by examiner

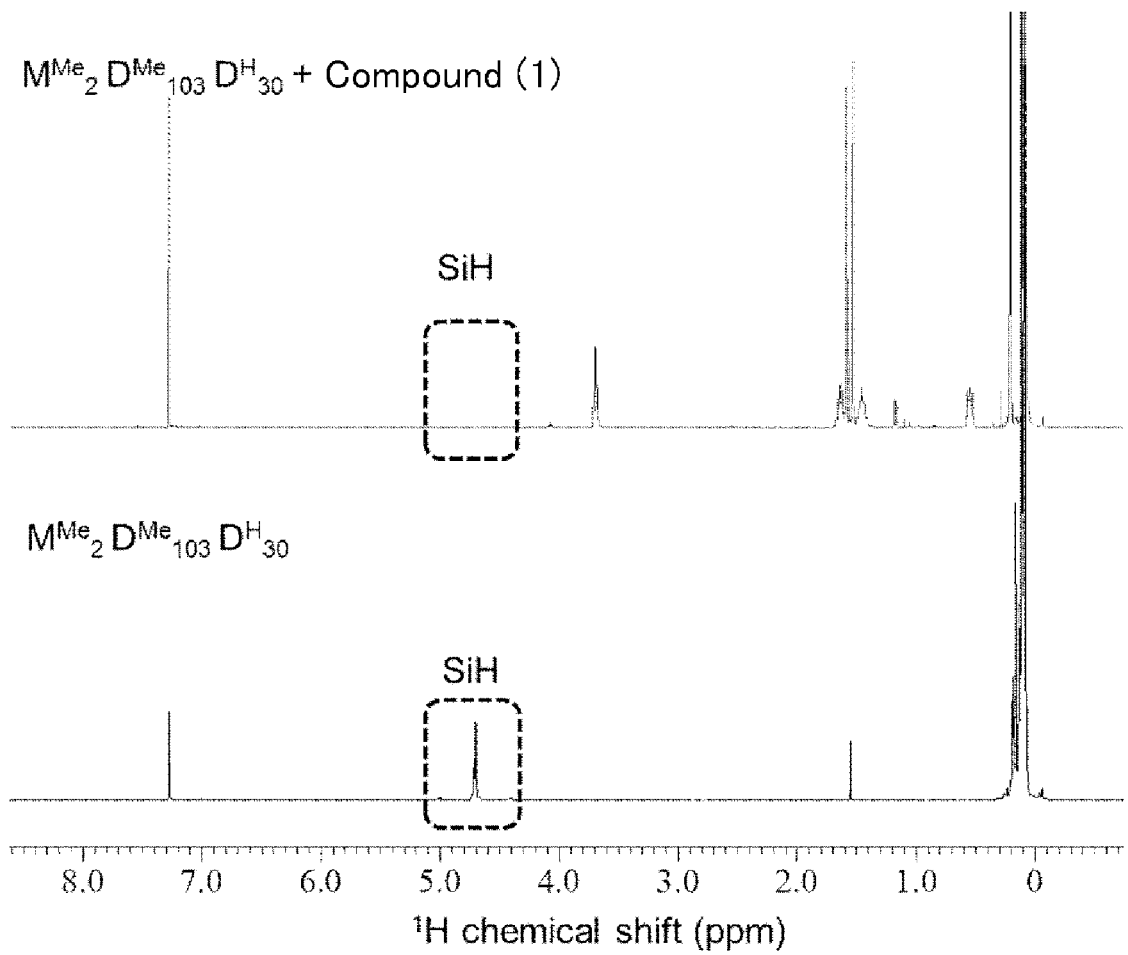

POLYMERIC POLYMERIZATION INITIATOR AND METHOD FOR PRODUCING POLYMERIC POLYMERIZATION INITIATOR

TECHNICAL FIELD

The present invention relates to: a novel polymeric polymerization initiator; and a method for producing the polymeric polymerization initiator.

BACKGROUND ART

A (meth)acrylic-grafted silicone having a silicone chain on a main chain and having a (meth)acryl (the term "(meth)acryl" used in the following description refers to methacryl and acryl) chain on a side chain has both a hydrophobic moiety and a polar moiety, and therefore, functions as a surfactant, and is used as a powder processing agent or a material for cosmetics. Patent Documents 1 and 2 disclose methods for producing this (meth)acrylic-grafted silicone.

Examples of the polymerization initiator in the method for producing a (meth)acrylic-grafted silicone of Patent Document 1 include radical polymerization initiators such as an azo initiator, a peroxide initiator, a persulfuric initiator, and a photopolymerization initiator. Examples of the polymerization initiators used in Patent Document 2 include radical polymerization initiators, specifically, a thermal polymerization initiator and a photopolymerization initiator.

Generally, a (meth)acrylic-grafted silicone is synthesized by a radical generated by an ordinary radical polymerization initiator such as those disclosed in Patent Document 1 and Patent Document 2 being transferred onto a sulfur atom of a mercapto-modified silicone by a chain transfer reaction, and (meth)acrylic monomers being polymerized therefrom. However, when a (meth)acrylic-grafted silicone is synthesized by such a method, the ordinary radical initiator, being the source of the radical, also becomes a polymerization initiation site, and (meth)acrylic monomers become polymerized. Consequently, there has been a problem that the final product becomes a mixture of a (meth)acrylic-grafted silicone and a (meth)acrylic polymer.

Meanwhile, a polymeric polymerization initiator is a polymer having a functional group that may become a polymerization initiation site, and characteristic polymers such as a graft copolymer or a block copolymer can be polymerized by polymerizing monomers using the polymeric polymerization initiator. In addition, theoretically, it is possible to suppress the product from becoming a mixture of a (meth)acrylic-grafted silicone and a (meth)acrylic polymer as described above since polymerization initiation sites are only present on the polymer chain.

However, a polymeric polymerization initiator for synthesizing a (meth)acrylic-grafted silicone has not been considered sufficiently. In particular, consideration of a polymeric polymerization initiator which enables a (meth)acrylic-grafted silicone to be synthesized by group transfer polymerization has been insufficient.

In addition, Patent Document 3 discloses a silicone having a ketene silyl acetal structure as an intermediate for synthesizing a sulfonyl-modified silicone. However, the silicone is not used as a polymeric polymerization initiator.

CITATION LIST

Patent Literature

Patent Document 1: JP 2014-177447 A
Patent Document 2: JP 2008-274116 A
Patent Document 3: U.S. Pat. No. 5,326,890 B2

SUMMARY OF INVENTION

Technical Problem

The present invention has been made in view of the above-described circumstances, and an object thereof is to provide: a polymeric polymerization initiator for obtaining a (meth)acrylic-grafted silicone by group transfer polymerization; and a method for producing the polymeric polymerization initiator.

Solution to Problem

To solve the above-described problems, the present invention provides
a polymeric polymerization initiator represented by the following general formula (I):

$$M^1{}_a M^2{}_b D^1{}_c D^2{}_d T^1{}_e T^2{}_f Q_g \quad (I)$$

$M^1 = R^1{}_3 SiO_{1/2}$
$M^2 = R^1{}_2 R^2 SiO_{1/2}$
$D^1 = R^1{}_2 SiO_{2/2}$
$D^2 = R^1 R^2 SiO_{2/2}$
$T^1 = R^1 SiO_{3/2}$
$T^2 = R^2 SiO_{3/2}$
$Q = SiO_{4/2}$ wherein in the general formula (I), $R^1$ each independently represents a hydrogen atom, a substituted or unsubstituted alkyl group having 1 to 10 carbon atoms, or a substituted or unsubstituted aryl group having 6 to 22 carbon atoms; $R^2$ represents a group having a ketene silyl acetal structure represented by the following general formula (II):

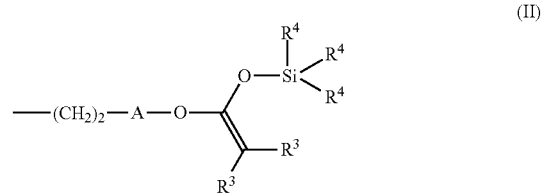

(II)

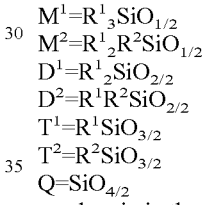

wherein in the general formula (II), A represents a single bond or a divalent organic group, $R^3$ each independently represents a hydrogen atom or a substituted or unsubstituted alkyl group having 1 to 4 carbon atoms, and $R^4$ each independently represents a substituted or unsubstituted alkyl group having 1 to 4 carbon atoms,
"a", "b", "c", "d", "e", "f", and "g" represent 0 or a positive integer where b+d+f≥1, and the polymerization initiator represented by the general formula (I) has a number-average molecular weight of 1,000 to 1,000,000 g/mol; and an order of bonding of siloxane units represented by $M^1$, $M^2$, $D^1$, $D^2$, $T^1$, $T^2$, and Q is optionally determined.

The inventive polymeric polymerization initiator as described makes it possible to synthesize a (meth)acrylic-grafted silicone by group transfer polymerization without the presence of a (meth)acrylic polymer derived from an ordinary radical initiator.

Furthermore, the present invention provides a method for producing the above-described polymeric polymerization initiator, comprising a step of adding a compound represented by the following general formula (III) to a hydrogensiloxane represented by the following general formula (IV) by a hydrosilylation reaction,

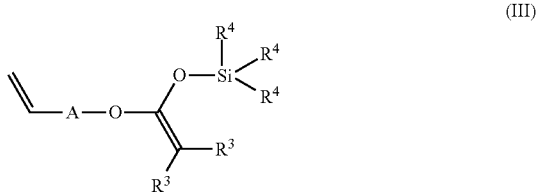

(III)

wherein in the general formula (III), A represents a single bond or a divalent organic group, $R^3$ each independently represents a hydrogen atom or a substituted or unsubstituted alkyl group having 1 to 4 carbon atoms, and $R^4$ each independently represents a substituted or unsubstituted alkyl group having 1 to 4 carbon atoms, $$M^3_h D^3_i T^3_j Q_k \quad \text{(IV)}$$

$M^3=R^5_3SiO_{1/2}$
$D^3=R^5_2SiO_{2/2}$
$T^3=R^5SiO_{3/2}$
$Q=SiO_{4/2}$ wherein $R^5$ each independently represents a hydrogen atom, a substituted or unsubstituted alkyl group having 1 to 10 carbon atoms, or a substituted or unsubstituted aryl group having 6 to 22 carbon atoms, and at least one is a hydrogen atom; "h", "i", "j", and "k" represent 0 or a positive integer where h+i+j≥1, and the hydrogensiloxane represented by the general formula (IV) has a number-average molecular weight of 500 to 900,000 g/mol; and an order of bonding of siloxane units represented by $M^3$, $D^3$, $T^3$, and Q is optionally determined.

The inventive polymeric polymerization initiator can be produced by such an addition reaction.

Advantageous Effects of Invention

By using the inventive polymeric polymerization initiator, it is possible to synthesize a (meth)acrylic-grafted silicone by group transfer polymerization without the presence of a (meth)acrylic polymer derived from an ordinary radical initiator.

BRIEF DESCRIPTION OF DRAWINGS

FIG. 1 is a general view of a $^1$H NMR chart after the reaction between a hydrogensiloxane and a compound represented by the formula (1) in Example 1.

DESCRIPTION OF EMBODIMENTS

The present inventor has repeated ingenuity, and as a result, has found that a silicone having a ketene silyl acetal structure represented by the following general formula (I) can be suitably used as a polymeric polymerization initiator that can synthesize a (meth)acrylic-grafted silicone by group transfer polymerization, and completed the present invention.

That is, the present invention is a polymeric polymerization initiator represented by the following general formula (I):

$$M^1_a M^2_b D^1_c D^2_d T^1_e T^2_f Q_g \quad \text{(I)}$$

$M^1=R^1_3SiO_{1/2}$
$M^2=R^1_2R^2SiO_{1/2}$
$D^1=R^1_2SiO_{2/2}$
$D^2=R^1R^2SiO_{2/2}$
$T^1=R^1SiO_{3/2}$
$T^2=R^2SiO_{3/2}$
$Q=SiO_{4/2}$ wherein in the general formula (I), $R^1$ each independently represents a hydrogen atom, a substituted or unsubstituted alkyl group having 1 to 10 carbon atoms, or a substituted or unsubstituted aryl group having 6 to 22 carbon atoms; $R^2$ represents a group having a ketene silyl acetal structure represented by the following general formula (II):

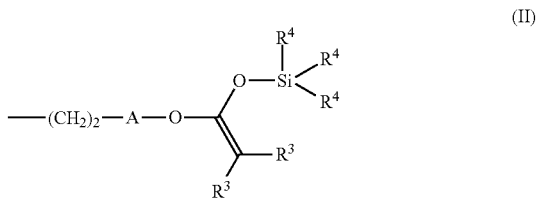

(II)

wherein in the general formula (II), A represents a single bond or a divalent organic group, $R^3$ each independently represents a hydrogen atom or a substituted or unsubstituted alkyl group having 1 to 4 carbon atoms, and $R^4$ each independently represents a substituted or unsubstituted alkyl group having 1 to 4 carbon atoms, "a", "b", "c", "d", "e", "f", and "g" represent 0 or a positive integer where b+d+f≥1, and the polymerization initiator represented by the general formula (I) has a number-average molecular weight of 1,000 to 1,000,000 g/mol; and an order of bonding of siloxane units represented by $M^2$, $M^2$, $D^2$, $D^2$, $T^1$, $T^2$, and Q is optionally determined.

The inventive polymeric polymerization initiator is represented by the general formula (I), and $R^2$ has a ketene silyl acetal structure. Since the ketene silyl acetal structure functions as an initiator of group transfer polymerization, the inventive polymeric polymerization initiator can be used as a polymeric polymerization initiator of group transfer polymerization.

In the general formula (I), $R^2$ each independently represents a hydrogen atom, a substituted or unsubstituted alkyl group having 1 to 10 carbon atoms, or a substituted or unsubstituted aryl group having 6 to 22 carbon atoms, preferably an alkyl group having 1 to 4 carbon atoms or an aryl group having 6 to 14 carbon atoms, further preferably a methyl group or a phenyl group. $R^2$ represents a group having a ketene silyl acetal structure represented by the general formula (II).

In the general formula (I), the order of bonding of the repeating units represented by $M^1$, $M^2$, $D^1$, $D^2$, $T^1$, $T^2$, and Q is optionally determined, and an arrangement constituted by the respective repeating units may be irregular, or may be regular. "a", "b", "c", "d", "e", "f", and "g" represent 0 or a positive integer, and the polymerization initiator represented by the general formula (I) has a number-average molecular weight of 1,000 to 1,000,000 g/mol, further preferably a number-average molecular weight of 1,000 to 100,000 g/mol, and further preferably a number-average molecular weight of 2,000 to 20,000 g/mol. b+d+f≥1, preferably 1 to 5000, further preferably 1 to 500. Note that in the present invention, the number-average molecular weight is a value in terms of polystyrene in GPC (gel permeation chromatography) analysis (hereinafter, number-average molecular weight refers to such a value in terms of polystyrene). If "b", "d", and "f" do not satisfy the conditional expression, the polymeric polymerization initiator of the general formula (I) does not have $R^2$ in a molecule thereof, and does not polymerize. In addition, if the number-average molecular weight of the polymeric polymerization initiator is outside the above-described range, reactivity of the polymerization becomes poor.

In the general formula (II), A represents a single bond or a divalent organic group, preferably an alkylene group having 1 to 10 carbon atoms or a substituted or unsubstituted divalent hydrocarbon group having 1 to 20 carbon atoms optionally containing one or more selected from —O—, —S—, and NR— (R represents a monovalent hydrocarbon group having 1 to 20 carbon atoms) (note that oxygen atoms, sulfur atoms, and nitrogen atoms are not adjacent to one another), further preferably an alkylene group having 0 to 6 carbon atoms. $R^3$ each independently represents a hydrogen atom or a substituted or unsubstituted alkyl group having 1 to 4 carbon atoms, preferably an alkyl group having 1 to 3, and further preferably a methyl group. $R^4$ each independently represents a substituted or unsubstituted alkyl group having 1 to 4 carbon atoms, preferably an alkyl group having 1 or 2 carbon atoms, and further preferably a methyl group.

The inventive polymeric polymerization initiator can be obtained by adding a compound represented by the following general formula (III) to a hydrogensiloxane represented by the following general formula (IV) by a hydrosilylation reaction.

Hereinafter, a method for producing the inventive polymeric polymerization initiator will be described in detail. This production method includes a step of obtaining the polymeric polymerization initiator by adding a compound represented by the following general formula (III):

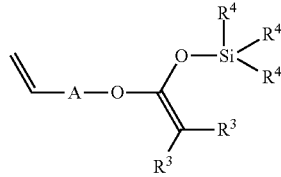
(III)

to a hydrogensiloxane represented by the following general formula (IV) by a hydrosilylation reaction.

(IV)

$M^3 = R^5_3 SiO_{1/2}$
$D^3 = R^5_2 SiO_{2/2}$
$T^3 = R^5 SiO_{3/2}$
$Q = SiO_{4/2}$
($R^5$ each independently represents a hydrogen atom, a substituted or unsubstituted alkyl group having 1 to 10 carbon atoms, or a substituted or unsubstituted aryl group having 6 to 22 carbon atoms, and at least one is a hydrogen atom. "h", "i", "j", and "k" represent 0 or a positive integer where h+i+j≥1, and the hydrogensiloxane represented by the general formula (IV) has a number-average molecular weight of 500 to 900,000 g/mol. The order of bonding of siloxane units represented by $M^3$, $D^3$, $T^3$, and Q is optionally determined.)

In the general formula (III), A, as described above, represents a single bond or a divalent organic group, preferably an alkylene group having 0 to 10 carbon atoms or a substituted or unsubstituted divalent hydrocarbon group having 1 to 20 carbon atoms optionally containing one or more selected from —O—, —S—, and NR—(R represents a monovalent hydrocarbon group having 1 to 20 carbon atoms) (note that oxygen atoms, sulfur atoms, and nitrogen atoms are not adjacent to one another), further preferably an alkylene group having 0 to 6 carbon atoms. $R^3$ each independently represents a hydrogen atom or a substituted or unsubstituted alkyl group having 1 to 4 carbon atoms, preferably an alkyl group having 1 to 3, further preferably a methyl group. $R^4$ each independently represents a substituted or unsubstituted alkyl group having 1 to 4 carbon atoms, preferably an alkyl group having 1 to 2 carbon atoms, further preferably a methyl group.

Examples of the compound represented by the general formula (III) include compounds having the following structures, but are not limited thereto.

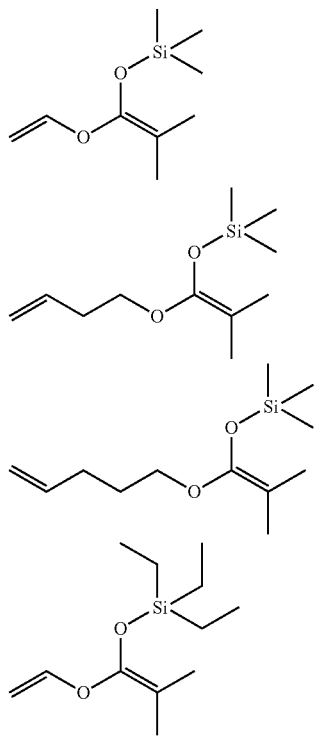

In the general formula (IV), $R^5$ each independently represents a hydrogen atom, a substituted or unsubstituted alkyl group having 1 to 10 carbon atoms, or a substituted or unsubstituted aryl group having 6 to 22 carbon atoms, preferably an alkyl group having 1 to 6 carbon atoms. However, at least one is a hydrogen atom. "h", "i", "j", and "k" represent 0 or a positive integer, and the hydrogensiloxane represented by the general formula (IV) has a number-average molecular weight of 500 to 900,000 g/mol, further preferably 1,000 to 100,000 g/mol, and particularly preferably 2,000 to 20,000 g/mol. If every $R^5$ is not a hydrogen atom, the produced compound cannot be polymerized. In addition, if the number-average molecular weight of the hydrogensiloxane of the general formula (IV) is outside the above-described range, reactivity of the produced polymeric polymerization initiator becomes poor.

The addition reaction is preferably performed with a catalyst, and a known addition reaction catalyst can be used. Examples include metal catalysts containing platinum, palladium, rhodium, ruthenium, gold, nickel, or the like. In particular, a catalyst containing platinum, palladium, or rhodium is preferable. A catalyst containing platinum is further preferable, and more specifically, $PtCl_4$, $H_2PtCl_6 \cdot 6H_2O$, a Pt-ether complex, a Pt-olefin complex, $PdCl_2(PPh_3)_2$, $PdCl_2(PhCN)_2$, and $RhCl_2(PPh_3)_3$ (in the formulae, Ph represents a phenyl group) can be used. The catalyst can be one catalyst alone or a mixture of two or more catalysts. The catalyst can be diluted with a solvent of alcohols, aromatic compounds, hydrocarbons, ketones, a basic solvent, or the like as necessary and used. In particular, a complex of 1,1,3,3-tetramethyl-1,3-divinyldisiloxane and neutralized sodium bicarbonate of chloroplatinic acid (Karstedt's catalyst) is the most suitable as an addition reaction catalyst.

It is sufficient for the amount of the catalyst to be a catalytic amount. A catalytic amount refers to an amount sufficient for making the addition reaction progress. The amount of the catalyst is 0.02 parts by mass or less in terms of the main metal of the metal catalyst, preferably 0.0001 to 0.02 parts by mass, particularly preferably 0.0003 to 0.005 parts by mass relative to 100 parts by mass of hydrogensiloxane. The catalyst can be added from the beginning of the reaction or can be added during the reaction over several times. In the inventive production method, the reaction can be sufficiently progressed even with a low amount of catalyst. However, if the amount of the catalyst is too low, reaction rate becomes slow, and therefore, the amount is preferably the above-described lower limit or more. Meanwhile, too large an amount of the catalyst is uneconomical and unfavorable, and does not particularly improve the reaction rate.

The amount of the compound represented by the general formula (III) is not particularly limited, and normally, the total number of alkenyl groups the compound represented by the general formula (III) has is 0.1 to 10, preferably 0.5 to 2 relative to one hydrosilyl group of the hydrogensiloxane.

The addition reaction may be without a solvent or an organic solvent may be used if necessary. As the organic solvent, an aromatic hydrocarbon solvent such as toluene, xylene, and benzene; an aliphatic hydrocarbon solvent such as hexane, cyclohexane, methylcyclohexane, and ethylcyclohexane; a chlorinated solvent such as chloroform, dichloromethane, and carbon tetrachloride; an ether solvent such as tetrahydrofuran (THF) and diethyl ether; a ketone solvent such as acetone and methyl ethyl ketone; dimethylformamide (DMF), and acetonitrile, etc. can be used, for example. In particular, an aromatic hydrocarbon such as toluene is the most suitable.

The addition reaction temperature is 20 to 250° C., preferably 40 to 180° C., particularly preferably 80 to 120° C. The reaction time is within 20 hours, preferably within 12 hours, particularly preferably within 8 hours.

The inventive polymeric polymerization initiator can produce a (meth)acrylic-grafted silicone by group transfer polymerization. A (meth)acrylic-grafted silicone produced by the inventive polymeric polymerization initiator has few by-product polymers unlike in a case where the (meth) acrylic-grafted silicone is synthesized by radical polymerization, and is therefore useful for cosmetics, fiber treatment agents, water repellents, oil repellents, release agents, and coating additives, for example.

EXAMPLE

Hereinafter, the present invention will be described in more detail with reference to Examples and Comparative Examples, but the present invention is not limited to the following Examples. In the following description, $^1$H NMR analysis was performed using ECX-500 II (manufactured by JEOL Ltd.) and using deuterated chloroform as a measuring solvent.

Note that the number-average molecular weight referred to in the present invention refers to a number-average molecular weight measured by GPC under the following conditions using polystyrene as a standard substance.

[Measurement Conditions]
Developing solvent: tetrahydrofuran (THF)
Flow amount: 0.6 mL/min
Detector: Differential refractive index detector (RI)
Column: TSK Guard column SuperH-L
TSKgel SuperH4000 (6.0 mm I.D.×15 cm×1)
TSKgel SuperH3000 (6.0 mm I.D.×15 cm×1)
TSKgel SuperH2000 (6.0 mm I.D.×15 cm×2)
(each available from Tosoh Corporation)
Column temperature: 40° C.
Sample injection amount: 50 μL (THF solution with a concentration of 0.5 mass %)

In addition, $M^{Me}$, $M^H$, $D^{Me}$, $D^{Ph}$, $D^H$, $T^{Me}$, and Q represent siloxane units, and each siloxane unit represents the following structure.
$M^{Me}=Me_3SiO_{1/2}$
$M^H=Me_2HSiO_{1/2}$
$D^{Me}=Me_2SiO_{2/2}$
$D^{Ph}=Ph_2SiO_{2/2}$
$D^H=MeHSiO_{2/2}$
$T^{Me}=MeSiO_{3/2}$
$Q=SiO_{4/2}$ Here, Me represents a methyl group and Ph represents a phenyl group.

Example 1

In a three-necked flask equipped with a thermometer and a cooling pipe were charged 100 parts by mass of hydrogensiloxane (number-average molecular weight: 7,780 g/mol) whose average composition was represented by $M^{Me}{}_2D^{Me}{}_{103}D^H{}_{30}$ and 85.1 parts by mass of the compound represented by the following formula (1), and were dissolved in 100 parts by mass of toluene. The temperature of the solution was raised to 100° C. using an oil bath, and 0.0333 parts by mass of a solution of a neutralized sodium bicarbonate of chloroplatinic acid-vinyl siloxane complex in toluene (platinum content: 0.5 wt %) was added dropwise. After adding dropwise, the solution was stirred for 6 hours while keeping the temperature of the solution at 100° C. Subsequently, the solvent was removed at 120° C. and 10 mmHg to obtain the target compound (number-average molecular weight: 16,850 g/mol). FIG. 1 is a general view of a $^1$H NMR chart after the reaction between a hydrogensiloxane and a compound represented by the formula (1) in Example 1. The obtained product was analyzed by $^1$H NMR, and it was confirmed that the peak attributable to hydrosilyl groups had disappeared, and that there was a peak attributable to a ketene silyl acetal structure near a $^1$H chemical shift of 0.2 ppm, 0.5 ppm, 1.4 to 1.6 ppm, and 3.7 ppm.

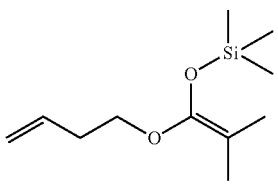

(1)

Example 2

In a three-necked flask equipped with a thermometer and a cooling pipe were charged 100 parts by mass of hydrogensiloxane (number-average molecular weight: 6,490 g/mol) whose average composition was represented by $M^{Me}_2D^{Me}_{123}D^H_{10}$ and 28.4 parts by mass of the compound represented by the formula (1), and were dissolved in 100 parts by mass of toluene. The temperature of the solution was raised to 100° C. using an oil bath, and 0.0333 parts by mass of a solution of a neutralized sodium bicarbonate of chloroplatinic acid-vinyl siloxane complex in toluene (platinum content: 0.5 wt %) was added dropwise. After adding dropwise, the solution was stirred for 6 hours while keeping the temperature of the solution at 100° C. Subsequently, the solvent was removed at 120° C. and 10 mmHg to obtain the target compound (number-average molecular weight: 13,110 g/mol). The obtained product was analyzed by $^1H$ NMR, and it was confirmed that the peak attributable to hydrosilyl groups had disappeared, and that there was a peak attributable to a ketene silyl acetal structure.

Example 3

In a three-necked flask equipped with a thermometer and a cooling pipe were charged 100 parts by mass of hydrogensiloxane (number-average molecular weight: 7,740 g/mol) whose average composition was represented by $M^{Me}_2D^{Me}_{113}D^H_{20}$ and 55.6 parts by mass of the compound represented by the formula (1), and were dissolved in 100 parts by mass of toluene. The temperature of the solution was raised to 100° C. using an oil bath, and 0.0333 parts by mass of a solution of a neutralized sodium bicarbonate of chloroplatinic acid-vinyl siloxane complex in toluene (platinum content: 0.5 wt %) was added dropwise. After adding dropwise, the solution was stirred for 6 hours while keeping the temperature of the solution at 100° C. Subsequently, the solvent was removed at 120° C. and 10 mmHg to obtain the target compound (number-average molecular weight: 14,960 g/mol). The obtained product was analyzed by $^1H$ NMR, and it was confirmed that the peak attributable to hydrosilyl groups had disappeared, and that there was a peak attributable to a ketene silyl acetal structure.

Example 4

In a three-necked flask equipped with a thermometer and a cooling pipe were charged 100 parts by mass of hydrogensiloxane (number-average molecular weight: 1,080 g/mol) whose average composition was represented by $M^{Me}_2D^{Me}_{10}D^H_5$ and 120 parts by mass of the compound represented by the formula (1), and were dissolved in 100 parts by mass of toluene. The temperature of the solution was raised to 100° C. using an oil bath, and 0.0333 parts by mass of a solution of a neutralized sodium bicarbonate of chloroplatinic acid-vinyl siloxane complex in toluene (platinum content: 0.5 wt %) was added dropwise. After adding dropwise, the solution was stirred for 6 hours while keeping the temperature of the solution at 100° C. Subsequently, the solvent was removed at 120° C. and 10 mmHg to obtain the target compound (number-average molecular weight: 2,850 g/mol). The obtained product was analyzed by $^1H$ NMR, and it was confirmed that the peak attributable to hydrosilyl groups had disappeared, and that there was a peak attributable to a ketene silyl acetal structure.

Example 5

In a three-necked flask equipped with a thermometer and a cooling pipe were charged 100 parts by mass of hydrogensiloxane (number-average molecular weight: 2,950 g/mol) whose average composition was represented by $M^H_2D^{Me}_{40}$ and 16.9 parts by mass of the compound represented by the formula (1), and were dissolved in 100 parts by mass of toluene. The temperature of the solution was raised to 100° C. using an oil bath, and 0.0333 parts by mass of a solution of a neutralized sodium bicarbonate of chloroplatinic acid-vinyl siloxane complex in toluene (platinum content: 0.5 wt %) was added dropwise. After adding dropwise, the solution was stirred for 6 hours while keeping the temperature of the solution at 100° C. Subsequently, the solvent was removed at 120° C. and 10 mmHg to obtain the target compound (number-average molecular weight: 3,920 g/mol). The obtained product was analyzed by $^1H$ NMR, and it was confirmed that the peak attributable to hydrosilyl groups had disappeared, and that there was a peak attributable to a ketene silyl acetal structure.

Example 6

In a three-necked flask equipped with a thermometer and a cooling pipe were charged 100 parts by mass of hydrogensiloxane (number-average molecular weight: 4,220 g/mol) whose average composition was represented by $M^{Me}_2D^{Ph}_9D^H_{43}$ and 154 parts by mass of the compound represented by the formula (1), and were dissolved in 100 parts by mass of toluene. The temperature of the solution was raised to 100° C. using an oil bath, and 0.0333 parts by mass of a solution of a neutralized sodium bicarbonate of chloroplatinic acid-vinyl siloxane complex in toluene (platinum content: 0.5 wt %) was added dropwise. After adding dropwise, the solution was stirred for 6 hours while keeping the temperature of the solution at 100° C. Subsequently, the solvent was removed at 120° C. and 10 mmHg to obtain the target compound (number-average molecular weight: 14,500 g/mol). The obtained product was analyzed by $^1H$ NMR, and it was confirmed that the peak attributable to hydrosilyl groups had disappeared, and that there was a peak attributable to a ketene silyl acetal structure.

Example 7

In a three-necked flask equipped with a thermometer and a cooling pipe were charged 100 parts by mass of hydrogensiloxane (number-average molecular weight: 9,850 g/mol) whose average composition was represented by $M^{Me}_6D^{Me}_{113}D^H_{20}T^{Me}_4$ and 28.4 parts by mass of the compound represented by the formula (1), and were dissolved in 100 parts by mass of toluene. The temperature of the solution was raised to 100° C. using an oil bath, and 0.0333 parts by mass of a solution of a neutralized sodium bicarbonate of chloroplatinic acid-vinyl siloxane complex in toluene (platinum content: 0.5 wt %) was added dropwise.

After adding dropwise, the solution was stirred for 6 hours while keeping the temperature of the solution at 100° C. Subsequently, the solvent was removed at 120° C. and 10 mmHg to obtain the target compound (number-average molecular weight: 15,230 g/mol). The obtained product was analyzed by $^1$H NMR, and it was confirmed that the peak attributable to hydrosilyl groups had disappeared, and that there was a peak attributable to a ketene silyl acetal structure.

Example 8

In a three-necked flask equipped with a thermometer and a cooling pipe were charged 100 parts by mass of hydrogensiloxane (number-average molecular weight: 7,720 g/mol) whose average composition was represented by $M^{Me}{}_{100}M^{H}{}_{20}Q_{60}$ and 39.9 parts by mass of the compound represented by the formula (1), and were dissolved in 100 parts by mass of toluene. The temperature of the solution was raised to 100° C. using an oil bath, and 0.0333 parts by mass of a solution of a neutralized sodium bicarbonate of chloroplatinic acid-vinyl siloxane complex in toluene (platinum content: 0.5 wt %) was added dropwise. After adding dropwise, the solution was stirred for 6 hours while keeping the temperature of the solution at 100° C. Subsequently, the solvent was removed at 120° C. and 10 mmHg to obtain the target compound (number-average molecular weight: 10,210 g/mol). The obtained product was analyzed by $^1$H NMR, and it was confirmed that the peak attributable to hydrosilyl groups had disappeared, and that there was a peak attributable to a ketene silyl acetal structure.

As described above, it was confirmed that the inventive polymeric polymerization initiator was obtained.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A polymeric polymerization initiator represented by the following general formula (I):

$$M^1{}_aM^2{}_bD^1{}_cD^2{}_dT^1{}_eT^2{}_fQ_g \quad (I)$$

$M^1=R^1{}_3SiO_{1/2}$ $M^2=R^1{}_2R^2SiO_{1/2}$ $D^1=R^1{}_2SiO_{2/2}$ $D^2=R^1R^2SiO_{2/2}$ $T^1=R^1SiO_{3/2}$ $T^2=R^2SiO_{3/2}$ $Q=SiO_{4/2}$ wherein in the general formula (I),
$R^1$ each independently represents a hydrogen atom, a substituted or unsubstituted alkyl group having 1 to 10 carbon atoms, or a substituted or unsubstituted aryl group having 6 to 22 carbon atoms;
$R^2$ represents a group having a ketene silyl acetal structure represented by the following general formula (II):

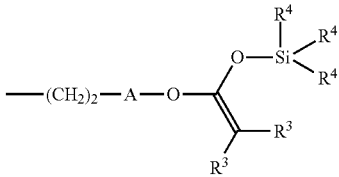

wherein in the general formula (II),
A represents a single bond or a divalent organic group,
$R^3$ each independently represents a hydrogen atom or a substituted or unsubstituted alkyl group having 1 to 4 carbon atoms, and
$R^4$ each independently represents a substituted or unsubstituted alkyl group having 1 to 4 carbon atoms,
"a", "c", "d", "e", "f", and "g" represent 0 or a positive integer and "b" represents 0 where b+d+f≥1;
the polymerization initiator represented by the general formula (I) has a number-average molecular weight of 2,000 to 1,000,000 g/mol; and
an order of bonding of siloxane units represented by $M^1$, $D^1$, $M^2$, $D^2$, $T^1$, $T^2$, and Q is optionally determined.

2. A method for producing the polymeric polymerization initiator according to claim 1, the method comprising:
adding a compound represented by the following general formula (III) to a hydrogensiloxane represented by the following general formula (IV) by a hydrosilylation reaction,

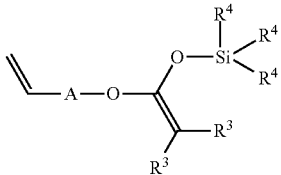

wherein in the general formula (III),
A represents a single bond or a divalent organic group,
$R^3$ each independently represents a hydrogen atom or a substituted or unsubstituted alkyl group having 1 to 4 carbon atoms, and
$R^4$ each independently represents a substituted or unsubstituted alkyl group having 1 to 4 carbon atoms, $$M^3{}_hD^3{}_iT^3{}_jQ_k \quad (IV)$$

$M^3=R^5{}_3SiO_{1/2}$ $D^3=R^5{}_2SiO_{2/2}$ $T^3=R^5SiO_{3/2}$ $Q=SiO_{4/2}$ wherein in the general formula (IV),
$R^5$ each independently represents a hydrogen atom, a substituted or unsubstituted alkyl group having 1 to 10 carbon atoms, or a substituted or unsubstituted aryl group having 6 to 22 carbon atoms, and at least one is a hydrogen atom; and
"h", "i", "j", and "k" represent 0 or a positive integer where h+i+j≥1;

the hydrogensiloxane represented by the general formula (IV) has a number-average molecular weight of 500 to 900,000 g/mol; and an order of bonding of siloxane units represented by $M^3$, $D^3$, $T^3$, and Q is optionally determined.

* * * * *